United States Patent [19]
Abbott et al.

[11] Patent Number: 5,719,483
[45] Date of Patent: Feb. 17, 1998

[54] INDUCTIVE COUPLING WAND HAVING A MOLDED MAGNETIC CORE

[75] Inventors: Russell M. Abbott, Riverside; William Quon, Alhambra, both of Calif.

[73] Assignee: Delco Electronics Corp., Kokomo, Ind.

[21] Appl. No.: 696,015

[22] Filed: Jul. 29, 1996

Related U.S. Application Data

[63] Continuation of Ser. No. 562,716, Nov. 27, 1995, abandoned, which is a continuation of Ser. No. 151,636, Nov. 15, 1993, abandoned.

[51] Int. Cl.⁶ .................................................. H02J 7/00
[52] U.S. Cl. ......................................................... 320/2
[58] Field of Search .............................. 320/2, 21; 336/66

[56] References Cited

U.S. PATENT DOCUMENTS

| | | | |
|---|---|---|---|
| 3,418,552 | 12/1968 | Holmes | 320/2 |
| 3,885,211 | 5/1975 | Gutai | 320/2 |
| 3,938,018 | 2/1976 | Dahl | 320/2 |
| 4,199,743 | 4/1980 | Martincic | 336/96 |
| 4,496,896 | 1/1985 | Melocik et al. | 320/2 |
| 4,684,869 | 8/1987 | Kobayashi et al. | 320/2 |
| 4,800,328 | 1/1989 | Bolger et al. | 320/2 |
| 5,070,293 | 12/1991 | Ishii et al. | 320/2 |
| 5,216,402 | 6/1993 | Carosa | 336/66 |
| 5,264,776 | 11/1993 | Hulsey | 320/2 |
| 5,323,099 | 6/1994 | Bruni et al. | 320/2 |
| 5,327,065 | 7/1994 | Bruni et al. | 320/2 |
| 5,434,493 | 7/1995 | Woody et al. | 320/2 |

FOREIGN PATENT DOCUMENTS

| | | |
|---|---|---|
| 0 552 737 | 1/1993 | European Pat. Off. . |
| 3-36711 | 2/1991 | Japan . |
| 3-101110 | 4/1991 | Japan . |
| 03 145 107 | 9/1991 | Japan . |
| 4-48610 | 2/1992 | Japan . |

*Primary Examiner*—Peter S. Wong
*Assistant Examiner*—Patrick B. Law
*Attorney, Agent, or Firm*—Mark A. Navarre

[57] ABSTRACT

Inductive charging systems comprising improved charging wands that are coupled between a source of power and a charging port that is coupled to a battery of an electric vehicle. The improvement provided by the present invention is that the charging wand has its magnetic core molded into its body. In one embodiment, a magnetic core is directly molded into the body of the charging wand. In another embodiment, the magnetic core is molded into a plastic ring that surrounds the core which in turn is secured into the body of the charging wand. The present invention improves the assembly process for charging wands by eliminating the wide tolerance range associated with core fabrication. Molding magnetic cores into the inductive charge wand eliminates the requirement for machining the side walls of the cores. By molding the cores directly into the wand or by molding the ring around the core and securing the molded assembly into the wand results in substantial cost savings by eliminating the need to machine the cores to exact tolerances.

1 Claim, 2 Drawing Sheets

INDUCTIVE COUPLING WAND HAVING A MOLDED MAGNETIC CORE

This is a continuation of application Ser. No. 08/562,716 filed on 27 Nov. 1995, now abandoned, which is a continuation of application Ser. No. 08/151636 filed on 15 Nov. 1993 now abandoned.

BACKGROUND

The present invention relates generally to inductive chargers for use in charging electric vehicles, and more particularly, to inductive chargers having magnetic cores molded into charging wands thereof.

Charging wands or couplers are employed as part of an inductive charging system and are used to charge batteries in electric vehicles. The inductive charging system comprises the charging wand and a charging port. The charging wand is a hand-held device that includes a magnetic core having a primary winding disposed in proximity thereto. The charging port is a device that is part of the vehicle and includes secondary cores and secondary windings that are coupled to the battery of the vehicle. The primary winding is coupled to a source of power and when the wand is inserted into the charging port, power is coupled from the power source to the battery of the electric vehicle.

Heretofore, the charging wands have been fabricated such that it has been necessary to machine the side walls of the magnetic core prior to assembly. It has also been necessary to machine the cores to exact tolerances, because core dimensions can vary by as much as 2% depending on the core mixture that is used. For example, a 2 inch diameter core has an overall tolerance zone of about 0.04 inches. To accurately machine the core to a tolerance of +0.010 increases the unit cost by 100%.

Accordingly, it is an objective of the present invention to provide for an inductive charger wherein the primary magnetic core is molded into the charging wand and hence eliminate the wide tolerance range of prefabricated magnetic cores.

SUMMARY OF THE INVENTION

In order to provide for the above and other objectives, the present invention comprises an inductive charging system comprising a charging wand that is coupled to a source of power and a charging port that is coupled to a battery of an electric vehicle. The improvement provided by the present invention is a charging wand having a magnetic core molded therein. In one embodiment, a magnetic core is directly molded into the charging wand. In another embodiment, the magnetic core is molded into a surrounding plastic disk, ring, or sleeve which in turn is secured into the body of the charging wand.

The present invention improves the assembly process for charging wands by eliminating the wide tolerance range associated with magnetic core fabrication. The present invention employs an injection molding method similar to those that mold metal inserts directly into a plastic part. In the present invention, no concern is given to the size of the magnetic core other than to provide sufficient plastic wall thickness to prevent pullout from the body of the wand when it is secured therein. Molding the magnetic cores into the inductive charge wand eliminates the requirement for machining the side walls of the magnetic cores. By molding the magnetic cores directly into the wand or by molding a ring around the core and securing the molded assembly into the wand results in substantial cost savings by eliminating the need to machine the cores to exact tolerances.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
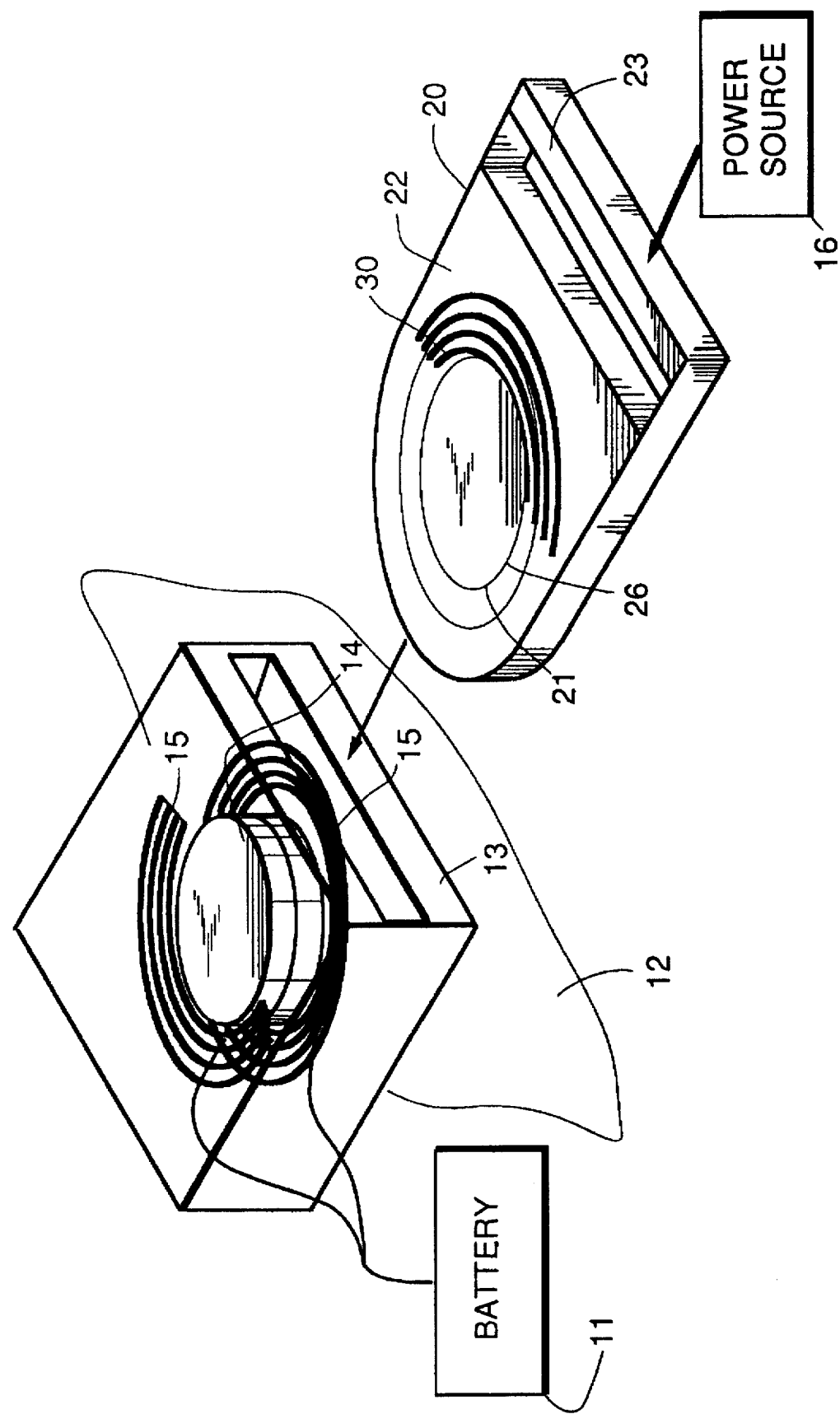
FIG. 1 illustrates a charging system for use in charging a battery of an electric vehicle that comprises an inductive charging wand having a magnetic core directly molded therein in accordance with the principles of the present invention.

Referring to the drawing figures, FIG. 1 illustrates a charging system 10 for use in charging a battery 11 of an electric vehicle 12 that comprises an inductive charging wand 20 having a magnetic core 21 directly molded therein in accordance with the principles of the present invention. The magnetic core 21 may be comprised of ferrite material, for example. The inductive charging system 10 comprises the charging wand 20 and a charging port 13. The charging port 13 is comprised of secondary magnetic cores 14, and secondary windings 15 that are coupled to the battery 11 of the electric vehicle 12, for example. The charging wand 20 is coupled to a power source 16.

The charging wand 20 is comprised of a body 22 having a handle 23 for gripping by a user. The body 22 is typically made of a plastic material such as glass filled polyester-type plastic, for example. The charging wand 20 includes a primary winding 30 that is electrically coupled to the power source 16 that is adapted to couple power to the battery 11 of the vehicle 12 by way of the charging port 13 and charging wand 20 when the charging wand 20 is inserted into the charging port 13.

Figure 2A:
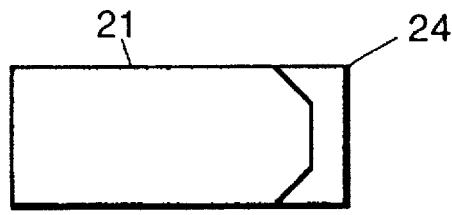
FIGS. 2a and 2b illustrate cross sectional views of embodiments of a magnetic core molded into a plastic ring that may be employed in the inductive charging wand of FIG. 1.
Figure 2B:
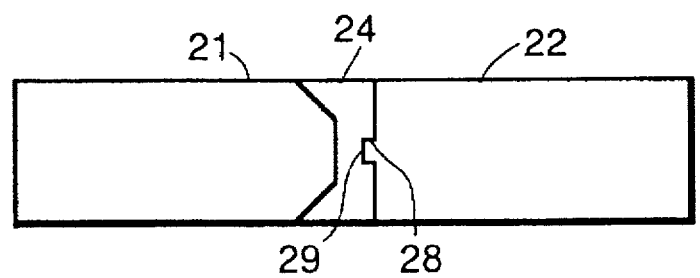
Figure 3:
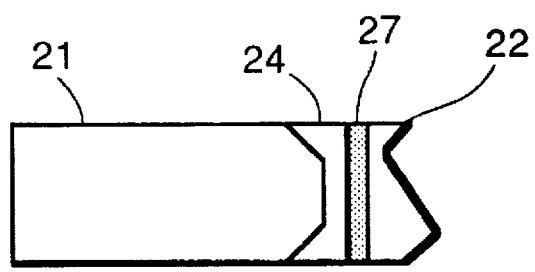
FIG. 3 illustrates the magnetic core of FIG. 2a secured into a charging wand.

The improvement provided by the present invention is that the charging wand 20 is designed such that its magnetic core 21 is molded into the body 22 of the wand 20. In one embodiment, a magnetic core 21 is directly molded into the charging wand 20. This embodiment is illustrated in FIG. 1. In a second embodiment, the magnetic core 21 is molded into a plastic disk, ring, or sleeve 24 that surrounds the magnetic core 21 and which in turn is secured into the body 22 of the charging wand 20. FIGS. 2a and 2b illustrate cross sectional views of embodiments of a magnetic core 21 molded into a plastic ring 24 that may be employed in the inductive charging wand 20 of FIG. 1 FIG. 2a illustrates the magnetic core 21 molded into the plastic ring 24. FIG. 2b shows the core 21 molded into a plastic ring 24 that has a groove 28 that mates with a lip 29 formed along the edge of the opening 26 in the body 22 of the wand 20 to secure the core 21 into the body 22. FIG. 3 illustrates the magnetic core 21 shown in FIG. 2a secured into the charging wand 20 by means of adhesive 27.

In view of the above, it should be appreciated that there are two aspects of the present invention. The first is to mold the magnetic core 21 directly in the inductive charging wand 20. The second is to mold the plastic ring 24 around the magnetic core 21 to form a molded core/ring assembly 25 and then secure the core/ring assembly 25 into the body 22 of the charging wand 20.

Molding the magnetic core 21 directly into the inductive charging wand 20 requires that the wand 20 is ready for final assembly. To fabricate such a wand 20, the component pieces of the charging wand 20 are assembled and placed into a molding fixture. Then the magnetic core 21 is placed into the molding fixture and secured or indexed in a manner that prevents it for moving relative to the wand 20 during the molding process. The molding fixture is closed and mold material (plastic) is poured or injected into cavities in the molding fixture. After curing, the molded and assembled charging wand 20 is removed from the molding fixture and the fabricated wand 20 has the magnetic core 21 molded into its body 22.

The second aspect of the present invention is to mold the plastic ting 24 around the periphery of the magnetic core 21 and then install the core/ring assembly 25 into an opening 26 formed in the charging wand 20. The outer periphery of the ring 24 may be held to a very accurate dimension that is set by the mold dimensions. This provides for controlled and repeatable assembly of the core/ring assembly 24 into the opening 26 in the body 22 of the charging wand 20. Securing the core/ring assembly 25 into the charging wand 20 may be accomplished by using the adhesive 27 to hold the core/ring assembly 25 in place, as shown in FIGS. 2 & 3. Typically, an adhesive 27 such as epoxy, or silicone, for example, may be employed to secure the core/ring assembly 25 in the charging wand 20.

The present invention may be employed in devices that provide for rapid, high rate charging of batteries or electric vehicle batteries 11, and that provide for power transfer between installations employing batteries 11, and the like.

Thus there has been described new and improved inductive charging systems having magnetic cores molded into the charging wands thereof. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A charging device for use in an inductive charging system wherein the charging device is coupled to a power source and insertable into a charging port that is coupled to a battery, the charging device comprising:

a magnetic core;

a surrounding member molded about the periphery of said magnetic core;

a body member having an opening for receiving said magnetic core and surrounding member, said surrounding member being secured to said body member, the surrounding member having a groove that mates with a lip formed along an edge of the opening in the body member; and a primary winding adapted to carry current from the power source, said primary winding being disposed in the body member in proximity to said magnetic core.

* * * * *